United States Patent [19]

Bormann et al.

[11] Patent Number: 6,100,887
[45] Date of Patent: *Aug. 8, 2000

[54] REUSABLE REVERSIBLE PROGRESS INDICATOR SOFTWARE COMPONENT FOR A GRAPHICAL USER INTERFACE

[75] Inventors: Richard J. Bormann, Howell, N.J.; Ann C. Fulop, Bloomington, Ill.; Steven J. Shute, Yardley, Pa.; Radakichenane Vengatatry, Edison; Phillip A. Weeks, Little Silver, both of N.J.

[73] Assignee: AT&T Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/985,865

[22] Filed: Dec. 5, 1997

Related U.S. Application Data

[60] Provisional application No. 60/051,568, Jul. 2, 1997.

[51] Int. Cl.[7] ........................................ G06F 3/14
[52] U.S. Cl. ........................ 345/339; 345/140; 345/440; 345/970
[58] Field of Search .................................. 345/333, 334, 345/339, 349, 335, 440, 140, 967, 970, 975

[56] References Cited

U.S. PATENT DOCUMENTS

| | | | |
|---|---|---|---|
| 5,226,120 | 7/1993 | Brown et al. | 395/200 |
| 5,261,044 | 11/1993 | Dev et al. | 395/161 |
| 5,284,494 | 2/1994 | Sprechter et al. | 379/59 |
| 5,295,244 | 3/1994 | Dev et al. | 395/161 |
| 5,301,348 | 4/1994 | Jaaskelainen | 345/348 |
| 5,394,522 | 2/1995 | Sanchez-Frank et al. | 395/159 |
| 5,483,631 | 1/1996 | Nagai et al. | 395/155 |
| 5,521,913 | 5/1996 | Gridley | 370/58.2 |
| 5,548,722 | 8/1996 | Jalalian et al. | 395/200.1 |
| 5,606,664 | 2/1997 | Brown et al. | 395/200.1 |
| 5,627,964 | 5/1997 | Reynolds et al. | 395/183 |
| 5,627,978 | 5/1997 | Altom et al. | 395/330 |
| 5,657,461 | 8/1997 | Harkins et al. | 345/333 |
| 5,751,965 | 5/1998 | Mayo et al. | 395/200.54 |
| 5,768,614 | 6/1998 | Takagi et al. | 395/821 |
| 5,793,845 | 8/1998 | Hollywood et al. | 379/88 |
| 5,819,042 | 10/1998 | Hansen | 395/200.52 |

OTHER PUBLICATIONS

Introducing Microsoft Windows 95 for Distribution with New PC, Microsoft Corp. pp. 62–63, 1995.
User Manual, Dr. Solomon's, Anti–Virus Ver. 7, pp. 13–15, 44 Oct. 1997.
Ted Landau, "Sad Macs Bombs Disaters, and to Do about Them", Addison–Wesley Publishing Co., 1993.

*Primary Examiner*—Raymond J. Bayerl
*Assistant Examiner*—Thomas T. Nguyen
*Attorney, Agent, or Firm*—Kenyon & Kenyon

[57] ABSTRACT

A GUI component that enables display of a progress indicator that changes color in a first direction corresponding to an activity being completed and changes color in a second direction different from the first direction corresponding to the activity being undone. The GUI component displaying the progress indicator can be associated with other GUI components The GUI component displaying the progress indicator can also display checkboxes that each change from being unchecked to being checked corresponding to its own activity portion being completed and changing from being checked to being unchecked corresponding to its own activity portion being undone.

20 Claims, 2 Drawing Sheets

| BORDER STYLE | INSET | 1500 |
|---|---|---|
| BORDER THICKNESS | 1 | 1505 |
| DIMENSION | | |
| X | 75 | 1510 |
| Y | 167 | 1515 |
| WIDTH | 120 | 1520 |
| HEIGHT | 75 | 1525 |
| DIRECTION | FORWARD | 1530 |
| FILL COLOR | GREEN | 1535 |
| FILL PERCENTAGE | 100 | 1540 |
| INCREMENT | | 1545 |
| CHECKBOX TITLES | ONE, TWO, THREE | 1550 |
| TITLE | THE TITLE | 1555 |
| TIME | 15 | 1560 |

REUSABLE REVERSIBLE PROGRESS INDICATOR SOFTWARE COMPONENT FOR A GRAPHICAL USER INTERFACE

CROSS-REFERENCE TO A RELATED PATENT APPLICATIONS

This application claims benefit of provisional application Ser. No. 60/051,568 filed Jul. 2, 1997. This patent application is related to the following commonly assigned U.S. Patent applications with the same inventors: *A Method And Apparatus For Using A Graphical Interface (GUI) As the Interface To A Distributed Platform Switch*, Ser. No. 08/985,862, filed Dec. 5, 1997, *A Method and Apparatus for Supervising a Distributed Platform Switch Through Graphical Representations*, Ser. No. 08/985,866, filed Dec. 5, 1997, *A Method And Apparatus For Supervising A Processor Within A Distributed Platform Switch Through Graphical Representations*, Ser. No. 08/986,220, filed Dec. 5, 1997, *Reusable Software Components for a Graphical User Interface for a Distributed Network Switch*, Ser. No. 08/985,775, filed Dec. 5, 1997, *A Reusable Light-Emitting Diode (LED) Canvas Software Component For A Graphical User Interface*, Ser. No. 08/986,219, filed Dec. 5, 1997, *A Reusable Sparing Cell Software Component For A Graphical User Interface*, Ser. No. 08/986,218, filed Dec. 5, 1997; and *A Reusable Sparing Cell Software Component For A Graphical User Interface*, Ser. No. 08/986,218, filed Dec. 5, 1997.

FIELD OF THE INVENTION

The present invention relates generally to a reusable software component which can assist in the application development of the graphical user interface.

BACKGROUND

Software-prototype developers typically need to rapidly design, develop and alter software code to meet changing requirements. The lack of software tools to assist software-prototype developers in a rapid, application-development environment is a driving force behind the creation of reusable components. Reusable components allow for the packaging of specific functionality into easy to use, abstract, reusable, standardized code.

For example, reusable standardized code can be developed with an object-oriented language, such as the Java programming language. The Java programming language comprises classes and objects. A class is a collection of data and methods (i.e., procedures) that operate on that data. An object is a specific embodiment of a particular class as defined by specific values of the data.

Classes can be combined to create packages. Classes can be selected for a particular package because the classes have related functionality and/or can synergistically assist the software developer in developing a particular type of software. For example, Java provides a set of packages to create graphical user interfaces (GUIs). These packages are collectively known as the Abstract Windows Toolkit (AWT). More specifically, one of the Java AWT packages includes such classes as the Checkbox, the Canvas, the Dialog, the Scrollbar, and the Button. When discussing software for a GUI, the terms "GUI components" can be used to refer to both the class and/or the associated object. In other words, the GUI component "Checkbox" can refer to the Checkbox class and/or to a particular checkbox embodiment.

The GUI components of known software tools and packages, however, do not address all situations needed for a GUI. For example, the GUI components of the known software tools and packages often are not designed to easily represent certain types of physical equipment.

SUMMARY OF THE INVENTION

The present invention allows a software developer to represent a progress indicator within a GUI by using a progress indicator GUI component.

The present invention allows a software developer to convey progress information about an activity using a progress indicator GUI component.

A graphical user interface (GUI) can be developed by loading a GUI component that enables display of a progress indicator that changes color in a first direction corresponding to an activity being completed and changes color in a second direction corresponding to the activity being undone. The progress indicator can be, for example, a reversible progress bar which fills in a forward direction corresponding to an activity being completed and fills in a backward direction corresponding to the activity being undone.

The progress indicator GUI component can be associated with another GUI component. For example, a software developer can develop software using the progress indicator GUI component and any other GUI component; the software can be for a GUI directly or can enable the eventual construction of a GUI.

The GUI component can further enable display of a set of checkboxes that change corresponding to changes in the progress indicator. The activity being completed or undone includes a set of activity portions. Each checkbox from the set of checkboxes can change from being unchecked to being checked corresponding to its own activity portion being completed and can change from being checked to being unchecked corresponding to its own activity portion being undone A first set of instructions can be constructed from the associated progress indicator GUI component and the GUI component. The first set of instructions can be provided to a remote processor. At the remote processor, the GUI can be constructed using the first set of instructions.

The progress indicator and associated checkboxes can dynamically represent changes in the progress information of an activity. The first set of instructions can be interpreted at the workstation to create a second set of instructions comprising machine codes specific to the remote processor.

A computer-readable medium can have stored thereon a first GUI component that enables display of a progress indicator that changes color in a first direction corresponding to an activity being completed and changes in a second direction corresponding to the activity being undone. The computer-readable medium further can have stored thereon instructions for enabling construction of a GUI. The instruction which, when executed by a processor, can cause the processor to associate the progress indicator GUI component with a GUI component to construct the GUI in the form of a second set of instructions.

The progress indicator GUI component can be based in Java computer language. The GUI can be in the form of a Java applet or a Java application. The GUI can be byte-codes for Java Virtual Machine located at a remote processor.

DETAILED DESCRIPTION

A reversible progress indicator can be used in a graphical user interface (GUI) to represent the progress of an activity. The reversible progress indicator can have any shape that, for example, becomes filled in corresponding to an activity being completed and becomes less filled in corresponding to an activity being undone. The reversible progress indicator can, for example, have the shape of a rectangular bar, a circle, or any other appropriate shape. Note that although the Reversible Progress Bar described in the detailed description is one embodiment of the present invention; the detailed description can be applied to other embodiments having different shapes.

Figures 1A, 1B:
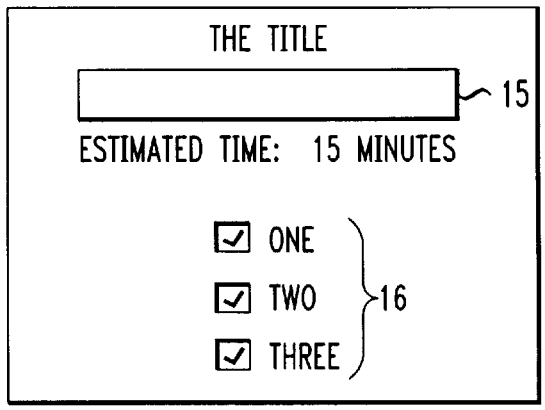
FIG. 1A shows a Reversible Progress Bar, according to an embodiment of the present invention.
FIG. 1B lists the property settings corresponding to the Reversible Progress Bar shown in FIG. 1A, according to an embodiment of the present invention.

FIG. 1A shows a Reversible Progress Bar and three associated checkboxes, according to an embodiment of the present invention. As an activity progresses forward, the interior of Reversible Progress Bar 15 becomes filled in; as the activity progresses backward, the interior of Reversible Progress Bar 15 becomes less filled in. Reversible Progress Bar 15 can progress in either direction: Reversible Progress Bar 15 can show an activity going towards completion or an activity going backwards towards being completely undone. For example, Reversible Progress Bar 15 can be used in a software update and in a software back out options provided by a network switch GUI. As software is installed on a computer system, Reversible Progress Bar 15 can fill in proportionally as the software update progresses. As software is uninstalled on a computer system, Reversible Progress Bar 15 can empty proportionally. The computer system can be, for example, a distributed network switch.

Figure 2:
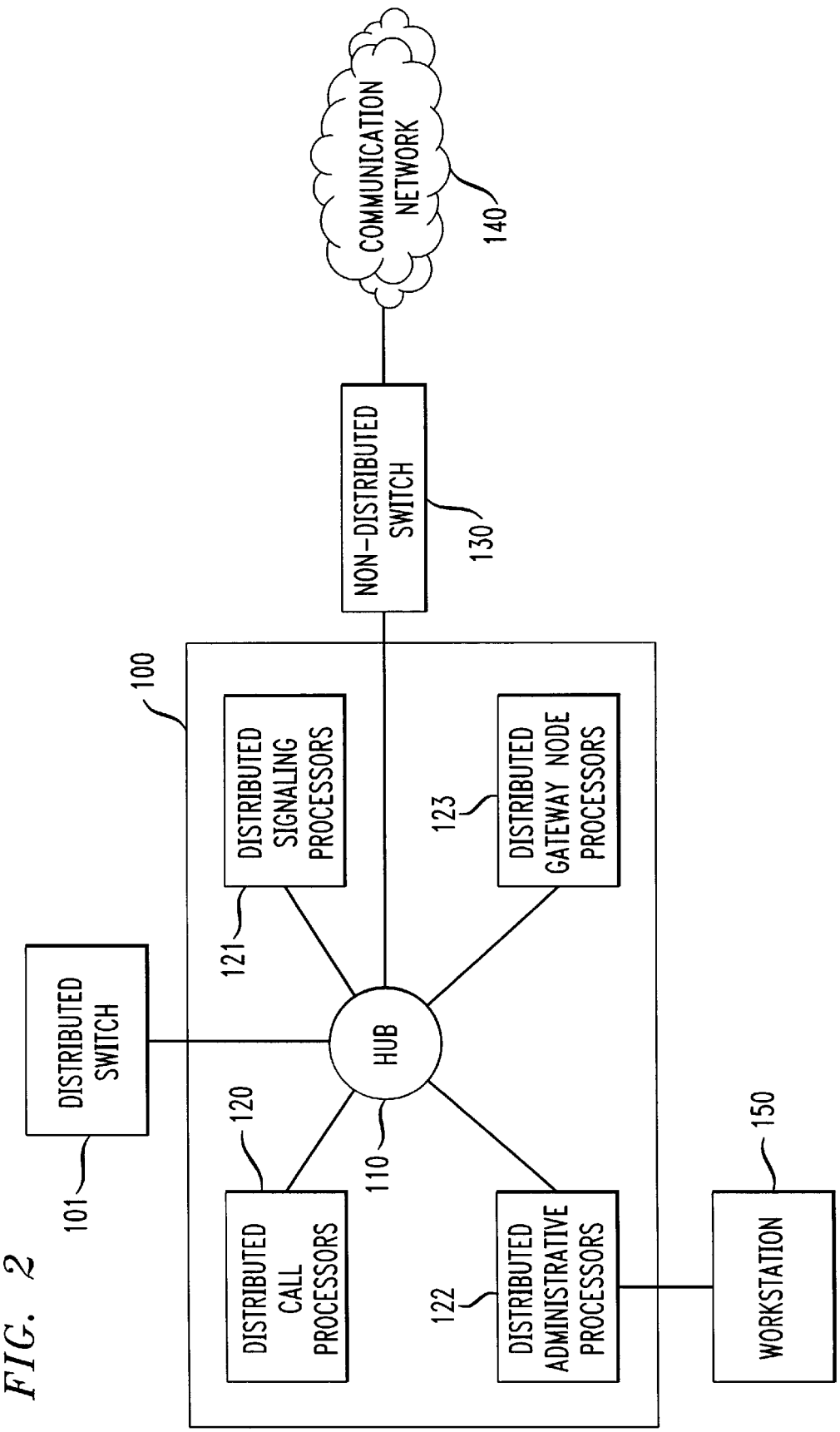
FIG. 2 shows a distributed switch having a network of distributed processors for which embodiment of the present invention can be used.

FIG. 2 shows a distributed switch having a network of distributed processors for which embodiment of the present invention can be used. FIG. 2 is for illustrative purposes only and in no way limits the type of system configurations for which embodiments of the present invention can be used.

Distributed switch 100 comprises hub 110, distributed call processors 120, distributed signaling processors 121, distributed administration processors 122, and distributed gateway node processors 123. Hub 110 connects distributed processors 120 through 123. Hub 110 also connects distributed switch 100 to non-distributed switch 130. Non-distributed switch 130 is connected to communications network 140. Distributed switch 100 can also be connected to another distributed switch, such as distributed switch 101. Workstation 150 is connected to one administrative processor from distributed administrative processors 122. Alternatively, workstation 150 can be included within distributed switch 100 rather than remotely connected to distributed switch 100. In the example shown in FIG. 2, a processor from distributed administration processors 122 can act as the local processor and workstation 150 can act as the remote processor. The commonly assigned patent application entitled A METHOD AND APPARATUS FOR USING A GRAPHICAL USER INTERFACE (GUI) AS THE INTERFACE TO A DISTRIBUTED PLATFORM SWITCH (Attorney Docket Bormann 2-22-2-2) provides a further description of the exemplary system configuration of the distributed switch shown in FIG. 2 and is incorporated by reference herein.

Reversible Progress Bar 15 also can be associated with a set of checkboxes 16, as illustrated in FIG. 1A. Checkboxes 16 can signify or represent the portion or substage of the activity that was just completed. When a portion of the activity is completed, as indicated by Reversible Progress Bar 15 progressing in the appropriate direction, the status of a checkbox from checkboxes 16 can be changed (i.e., changed from unchecked to checked, or from checked to unchecked). Each checkbox of checkboxes 16 can have an associated title. NS Reversible Progress Bar 15 can also be associated with a static text label (e.g. "Estimated Time: 15 minutes") providing information about the expected duration of the operation to be performed, as illustrated in FIG. 1A. Alternatively, this label can also provide a dynamic indication (i.e., updated regularly in parallel with the filling or unfiling of the progress bar) of the estimated time remaining to complete the operation in progress (e.g., "Estimated time remaining: x minutes," where x is updated regularly to reflect the time remaining).

Reversible Progress Bar 15 can be employed by a software developer to create software instructions that create a GUI. The software instructions that construct a GUI can be located at a local processor. A remote processor connected to that local processor can access the software instructions to construct the GUI. For example, the local processor can be a processor of a distributed network switch and the remote processor can be a workstation connected to this processor of the distributed network switch. Returning to the example of FIG. 2, a processor from distributed administrative processors 122 can act as the local processor and workstation 150 can act as the remote processor.

The software instructions created from the GUI components can programmed in an interpreted language and can be platform independent. For example, the instructions can be programmed in the Java™ programming language by Sun Microsystems, Inc.® for a platform that includes a Java Virtual Machine (JVM). Consequently, when a remote processor having the JVM downloads the instructions, the instructions can be interpreted into machine code specific to that remote processor.

The Reversible Progress Bar GUI component can be associated, for example, with the Java Abstract Windows Toolkit (AWT) package so that the software developer can use the Reversible Progress Bar GUI component in conjunction with the GUI components in the Java AWT package.

Alternatively, the Reversible Progress Bar GUI component, for example, can be modified and incorporated into Java applications, Java applets, and/or JavaScript applications. Java applications are Java programs that run standalone, i.e., do not require an applet viewer such as a Web browser like HotJava™ by Sun Microsystems, Netscape Navigator® by Netscape Communications Corp., or a separate program like Sun Microsystems' appletviewer. Java applets are embedded Java applications that run in the context of an applet viewer. JavaScript™ is a scripting language created by Sun Microsystems and Netscape Communications that scripts the Netscape Navigator browser.

Furthermore, the Reversible Progress Bar GUI component can also be in the format of JavaBeans™ by Sun Microsystems. JavaBeans are reusable Java software components which can be used with a software development environment, such as Visual Cafe by Symantec Corporation. Software development environments can integrate visual and source views of the components through use of certain features such as, for example, drag-and-drop. The drag-and-drop feature allows a software developer to modify the property values associated with the GUI component while simultaneously viewing the modifications. The Reversible Progress Bar GUI component can be incorporated with the drag-and-drop feature.

FIG. 1B lists the property settings corresponding to the Reversible Progress Bar shown in FIG. 1A, according to an embodiment of the present invention.

Fill Color property 1535 can specify the color that fills or empties the Reversible Progress Bar 15.

Direction property 1530 can have the values of "forward" or "reverse." Direction property 1530 can be used to control whether the bar will be filled thereby indicating the associated task is being completed, or whether the bar will be emptied thereby indicating the associated task is being undone.

Fill Percentage property 1540 can indicate the percentage of Reversible Progress Bar 15 to be filled with the color specified in Fill Color property 1535. For example, when the value of Fill Percentage 1540 is at "50," Reversible Progress Bar 15 is half filled. The value of Fill Percentage 1540 can be checked and used in subsequent processing.

Increment property 1545 can increment Reversible Progress Bar 15 by a fixed amount. For example, if the Progress Bar 15 is filled fifty percent (i.e., Fill Percentage 1540 has a value of "50") and Increment 1545 has a value of "10," Progress Bar be filled sixty percent when Direction 1530 has a value of "forward" and filled forty percent when Direction 1530 has a value of "backward." The value of Increment 1545 can be checked and used in subsequent processing.

The software developer can update Fill Percentage property 1540 to continually update Reversible Progress Bar 15 as the associated activity progresses. Alternatively, the software developer can use Increment property 1545 to increment the progress bar a fixed amount as the associated activity progresses.

Border Style property 1500 can indicate the type of border shown around Reversible Progress Bar 15. Border Style property 1500 can have the following values: "solid," "inset," "raised" and "etched." Border Thickness property 1505 can indicate the width of the border in pixels. Thickness property 1505 has a minimum value of least "1."

Title 1555 can indicate the title of the canvas in which Reversible Progress Bar 15 and/or its associated checkboxes 16 can be located. Title 1555 can be changed to indicate a portion or substage of the activity progresses in a forward or reverse direction. Time 1560 can indicate the estimated time (in minutes) to complete the operation being performed (e.g. Software Update). This static value would be provided by the software controlling the operation, and displayed as part of an "Estimated Time" text label as shown in FIG. 15A. Alternatively, this property could be dynamically updated and displayed in tandem with the filling of the progress bar, to show the estimated amount of time remaining to completion of the operation.

Checkbox Titles 1550 can indicate the title associated with each checkbox from checkboxes 16 and determines the number of checkboxes. For example, if Checkbox Titles 1550 has three values separated by a comma, then three checkboxes will be displayed and associated with Reversible Progress Bar 15.

Each checkbox from checkboxes 16 can change from being unchecked to being checked as a corresponding portion or substage of the activity progresses in the forward direction. Similarly, each checkbox from checkboxes 16 can change from being checked to being unchecked as a corresponding portion of the activity progresses in the reverse direction. The status of checkboxes 16 can be changed (i.e., changed from unchecked to checked, or from checked to unchecked) based on the number of checkboxes. For example, when Checkbox Title 1550 has three entries and, consequently, three checkboxes, each checkbox will change status as one-third of the activity progresses and as one-third of Reversible Progress Bar 15 is filled or emptied. In other words, when three checkboxes are selected and Direction has a value of "forward," the first checkbox will become checked when Reversible Progress Bar 15 is one-third filled, the second checkbox will become checked when Reversible Progress Bar 15 is two-third filled and the third checkbox will become check when Reversible Progress Bar 15 is completely filled.

Similarly, when three checkboxes are selected and Direction has a value of "reverse," the third checkbox will change from checked to unchecked when Reversible Progress Bar 15 is one-third empty, the second checkbox will change from unchecked to checked when Reversible Progress Bar 15 is two-third empty and the first checkbox will changed from checked to unchecked when Reversible Progress Bar 15 is completely empty.

In an alternative embodiment, checkboxes 16 can change status in uneven intervals through additional properties associated with the Reversible Progress Bar. The uneven intervals can correspond to functional substages in the activity. Where the activity relates to new software installation on a distributed switch, the functional substages can include, for example, whether all relevant processors are operational, whether all relevant processors are running the same software version, and whether installation information exists for all relevant hardware elements.

Where the activity relates to new software installation on a distributed switch, after new software has been installed a period of time exists, referred to herein as "soaking," where the operator can decide whether to keep the newly installed version of the software or whether to uninstall the software to the previous version. In the case where the operator wants to keep the newly installed version of the software, this version can be designated as the new permanent version which will be used for any future reinitialization of the processors associated with the distributed switch. In the case where the operator wants to uninstall the newly installed version of the software, this version can be uninstalled and the Reversible Progress Bar can indicate the progress of the software being uninstall as described above.

It should, of course, be understood that while the present invention has been described in reference to particular arrangement of the reversible progress bar GUI component, other arrangements and processes should be apparent to those of ordinary skill in the art. For example, the Reversible Progress Bar can be associated with another GUI component so that the Reversible Progress Bar is located within the other GUI component.

What is claimed is:

1. A method for developing a graphical user interface (GUI), comprising:

(a) loading a first GUI component that enables display of a progress indicator to indicate a composite trend of a computer activity changes color in a first direction corresponding to the computer activity having a composite trend toward being completed and changes color in a second direction different from the first direction corresponding to the computer activity having a composite trend toward being undone; and (b) associating the first GUI component with a second GUI component.

2. The method of claim 1, wherein the first GUI component further enables display of a plurality of checkboxes, the computer activity includes a plurality of computer activity portions, each checkbox from the plurality of checkboxes changing from being unchecked to being checked corresponding to its own computer activity portion being completed and changing from being checked to being unchecked corresponding to its own computer activity portion being undone.

3. The method of claim 1, further comprising:
(c) constructing a first plurality of instructions from the first GUI component and the second GUI component associated in step (b); and
(d) providing the first plurality of instructions to a remote processor.

4. The method of claim 3, further comprising:
(e) constructing, at the remote processor, the GUI using the first plurality of instructions.

5. The method of claim 3, further comprising the step of:
(e) interpreting the first plurality of instructions at the workstation to create a second plurality of instructions comprising machine codes specific to the workstation.

6. The method of claim 1, wherein the second direction is opposite from the first direction.

7. An article of manufacture, comprising:
a computer-readable medium having stored thereon a first GUI component that enables display of a progress indicator to indicate a composite trend of a computer activity changes color in a first direction corresponding to the computer activity having a composite trend toward being completed and changes color in a second direction corresponding to the computer activity having a composite trend toward being undone.

8. The article of manufacture of claim 7, wherein the computer-readable medium further has stored thereon a first plurality of instructions for enabling construction of a graphical user interface (GUI), said first plurality of instructions which, when executed by a first processor, cause the first processor to:
(a) associate the first GUI component with a second GUI component to construct a second plurality of instructions.

9. The article of manufacture of claim 7, wherein the first GUI component further enables display of a plurality of checkboxes, the computer activity includes a plurality of activity portions, each checkbox from the plurality of checkboxes changing from being unchecked to being checked corresponding to its own activity portion being completed and changing from being checked to being unchecked corresponding to its own activity being undone.

10. The article of manufacture of claim 7, wherein the second direction is opposite from the first direction.

11. A method for managing a distributed switch using a graphical user interface (GUI), comprising the steps of:
(a) receiving a first plurality of instructions that enables use of a first GUI component associated with a second GUI component, the first GUI component enabling display of a reversible composite-trend progress indicator;
(b) interpreting the first plurality of instructions to create a second plurality of instructions comprising machine codes specific to a processor; and
(c) constructing the GUI from the second plurality of instructions.

12. An apparatus for developing a graphical user interface (GUI), comprising:
means for loading a first GUI component that enables display of a progress indicator to indicate a composite trend of a computer activity changes color in a first direction corresponding to the computer activity having a composite trend toward being completed and changes color in a second direction different from the first direction corresponding to the computer activity having a composite trend toward being undone; and
means for associating the first GUI component with a second GUI component.

13. A computer for using a graphical user interface (GUI), comprising:
a computer-readable memory containing:
(a) a state program receiving state information; and
(b) a GUI program enabling display of a GUI, the GUI program including a GUI component that enables display of a progress indicator to indicate a composite trend of a computer activity changes color in a first direction corresponding to a computer activity having a composite trend toward being completed and changes color in a second direction corresponding to the computer activity having a composite trend toward being undone; and
a processor connected to said computer-readable memory, said processor running the state program and the GUI program.

14. The computer of claim 13, wherein the GUI component further enables display of a plurality of checkboxes, the activity includes a plurality of activity portions, each checkbox from the plurality of checkboxes changing from being unchecked to being checked corresponding to its own activity portion being completed and changing from being checked to being unchecked corresponding to its own activity portion being undone.

15. The computer of claim 14, wherein:
said computer-readable memory further contains:
(c) an update program dynamically updating a checkbox from the plurality of checkboxes of the GUI component to represent changes in the state information; and
said program runs the update program.

16. The computer of claim 13, wherein:
said computer-readable memory further contains:
(c) a update program dynamically updating the progress indicating of the GUI component to represent changes in the state information; and
said program runs the update program.

17. The method of claim 13, wherein the second direction is opposite from the first direction.

18. A method for developing a graphical user interface (GUI), comprising:
loading a first GUI component that enables display of a progress indicator for a computer activity being partially completed and partially undone simultaneously,
the progress indicator changing color in a first direction corresponding to the computer activity being more partially completed than partially undone, and
the progress indicator changing color in a second direction different from the first direction corresponding to the computer activity being more partially undone than partially completed; and
associating the first GUI component with a second GUI component.

19. A method for developing a graphical user interface (GUI), comprising:

loading a first GUI component that enables display of a progress indicator for a computer activity having a plurality of portions, the progress indicator changing color in a first direction corresponding to the plurality of portions being completed, and the progress indicator changing color in a second direction different from the first direction corresponding to the plurality of portions being undone; and associating the first GUI component with a second GUI component.

20. A method for developing a graphical user interface (GUI), comprising:

loading a first GUI component that enables display of a progress indicator for a computer activity performed by a plurality of processors, the progress indicator changing color in a first direction corresponding to the computer activity being completed by at least one processor from the plurality of processors, and the progress indicator changing color in a second direction different from the first direction corresponding to the computer activity being undone by at least one processor from the plurality of processors; and associating the first GUI component with a second GUI component.

* * * * *